United States Patent
Mullin

(10) Patent No.: US 8,031,142 B1
(45) Date of Patent: Oct. 4, 2011

(54) DC OFFSET CORRECTION FOR AN ELECTROLUMINESCENT PANEL

(75) Inventor: Jeffrey Doyle Mullin, Wellington, CO (US)

(73) Assignee: National Semiconductor Corporation, Santa Clara, CA (US)

( * ) Notice: Subject to any disclaimer, the term of this patent is extended or adjusted under 35 U.S.C. 154(b) by 1331 days.

(21) Appl. No.: 11/532,041

(22) Filed: Sep. 14, 2006

(51) Int. Cl.
*G09G 3/30* (2006.01)

(52) U.S. Cl. .......... 345/78; 345/82; 345/204; 315/169.3

(58) Field of Classification Search .............. 345/76–83, 345/213, 691–693, 102
See application file for complete search history.

(56) References Cited

U.S. PATENT DOCUMENTS

| | | | | |
|---|---|---|---|---|
| 4,769,753 | A * | 9/1988 | Knudson et al. | 363/60 |
| 4,959,557 | A * | 9/1990 | Miller | 327/175 |
| 7,259,627 | B1 * | 8/2007 | Dhanasekaran et al. | 330/259 |
| 2005/0057231 | A1 * | 3/2005 | Morita | 323/268 |
| 2007/0210996 | A1 * | 9/2007 | Mizukoshi et al. | 345/77 |

OTHER PUBLICATIONS

Patangia et al.: "A Multi-Level Inverter for Driving a High Voltage Display," University of Arkansas, Donaghey College of Information Science and Systems Engineering, IEEE, 2005, pp. 4461-4464.
Shih et al.: "Offset of the electrical characteristics of alternating-current thin-film electroluminescent devices," Appl. Phys. Lett. 69 (13), American Institute of Physics, Sep. 1996, pp. 1921-1923.
"HV803, HV8051, and HV8053 EL Lamp Driver Circuits," HV8XX Series Application Note AN-H33, Supertex Inc., 2001, pp. 1-12.
"Basics of EL Panel Drive Techniques," HVMOS Application Note AN-H3, Supertex Inc., 2001, pp. 1-3.

* cited by examiner

*Primary Examiner* — Lun-Yi Lao
*Assistant Examiner* — Insa Sadio
(74) *Attorney, Agent, or Firm* — Frommer Lawrence & Haug LLP; Matthew M. Gaffney

(57) ABSTRACT

A circuit for EL panel DC offset correction is provided. The circuit includes components such as an EL panel driver, an error circuit, a pulse width modulation circuit, and a low-pass filter. The low-pass filter performs low-pass filtering on the voltage across the EL panel to provide a low-pass filter output signal. Further, the error circuit receives the low-pass filter output signal and a reference signal, and provides an error signal. The DC bias across the EL panel is adjusted based, at least in part, on the error signal. In this way, DC offset correction is provided based on the negative feedback.

9 Claims, 6 Drawing Sheets

DC OFFSET CORRECTION FOR AN ELECTROLUMINESCENT PANEL

FIELD OF THE INVENTION

The invention is related to electroluminescent (EL) panels, and in particular but not exclusively, to a method an apparatus for employing negative feedback to provide DC offset correction for an EL panel.

BACKGROUND OF THE INVENTION

The term electroluminescence refers to light emission that occurs when current is passed through an electroluminescent material, typically a semiconductor. Electroluminescence is distinct from incandescence, which is light emission caused by heat. The light emission of electroluminescence is caused by hole-electron recombination. Electroluminescent panels may be used in various applications. For example, phosphor-based EL panels may be used for backlighting applications for a liquid crystal display (LCD) for a small mobile device (such as a cell phone, PDA, or the like).

BRIEF DESCRIPTION OF THE DRAWINGS

Non-limiting and non-exhaustive embodiments of the present invention are described with reference to the following drawings, in which.

DETAILED DESCRIPTION

Figure 1:
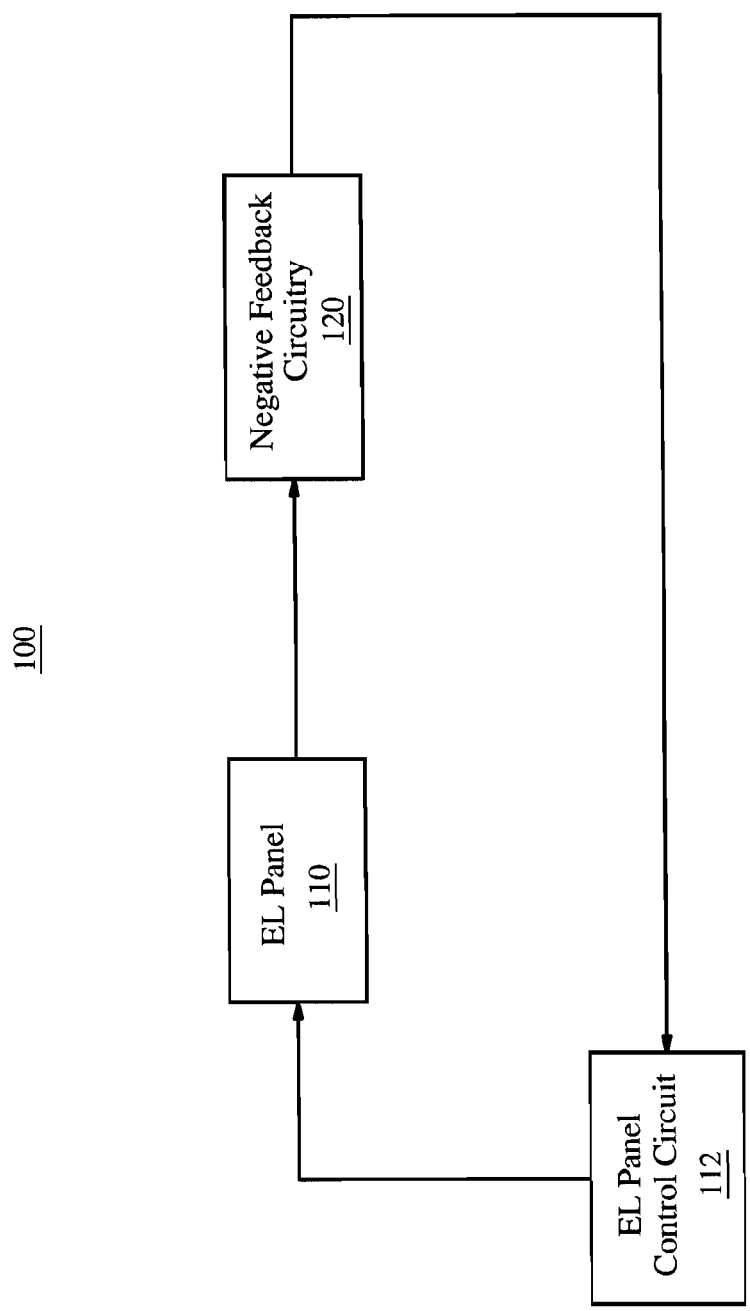
FIG. 1 shows a block diagram of an embodiment of a circuit for EL panel DC offset correction.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor (FET) or a bipolar junction transistor (BJT) may be employed as an embodiment of a transistor, the scope of the words "gate", "drain", and "source" includes "base", "collector", and "emitter", respectively, and vice versa.

Briefly stated, the invention is related to a circuit for EL panel DC offset correction. The circuit includes components such as an EL panel driver, an error circuit, and a low-pass filter. The low-pass filter performs low-pass filtering on the voltage across the EL panel to provide a low-pass filter output signal. Further, the error circuit receives the low-pass filter output signal and a reference signal, and provides an error signal. The DC bias across the EL panel is adjusted based, at least in part, on the error signal. In this way, DC offset correction is provided based on the negative feedback.

FIG. 1 shows a block diagram of an embodiment of circuit 100. Circuit 100 includes EL panel 110, EL panel control circuit 112, and negative feedback circuitry 120.

EL panel control circuit 112 is configured to control and drive EL panel 110. Negative feedback circuitry 120 is arranged to employ negative feedback to adjust the DC voltage across EL panel 110 for DC offset correction.

Adjusting the DC voltage across EL panel 110 may be accomplished in different ways in different embodiments. For example, in one embodiment, adjusting the DC voltage across EL panel 110 may be accomplished by adjusting a duty cycle of a switching frequency for the EL panel driver. In another embodiment, adjusting the DC voltage across EL panel 110 may be accomplished by adjusting a supply voltage for driving EL panel 110. In yet another embodiment, adjusting the DC voltage may be accomplished by a combination of both of the above methods. These embodiments and others are within the scope and spirit of the invention.

Figure 2:
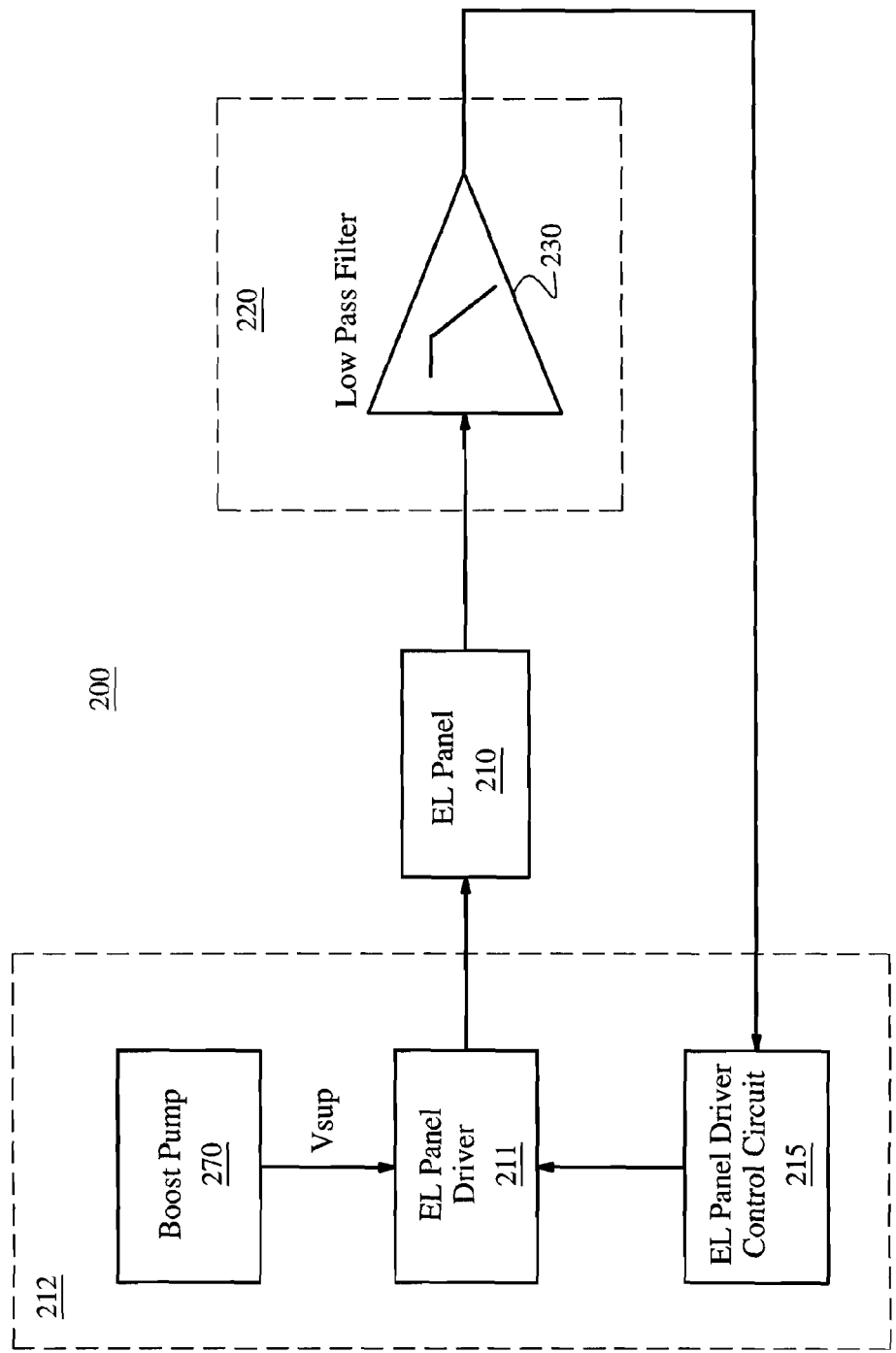
FIG. 2 illustrates a block diagram of an embodiment of the circuit of FIG. 1.

FIG. 2 illustrates a block diagram of an embodiment of circuit 200, which may be employed as an embodiment of circuit 100 of FIG. 1. Negative feedback circuitry 220 includes low-pass filter 230. EL panel control circuit 212 includes EL panel driver 211, EL panel driver control circuit 215, and boost pump 270.

EL panel driver 211 is arranged to drive EL panel 210. EL panel 211 includes switches (not shown). EL panel driver control circuit 215 employs a clock signal to control the switches in EL panel 211. Boost pump 270 is arranged to provide a supply voltage to EL panel driver 211.

In one embodiment, the switching frequency of the clock signal is constant, but the duty cycle is adjustable based on the negative feedback. In this embodiment, negative feedback circuitry 220 is arranged to employ negative feedback to adjust the duty cycle of the clock signal for DC offset correction for the EL panel.

Figure 3:
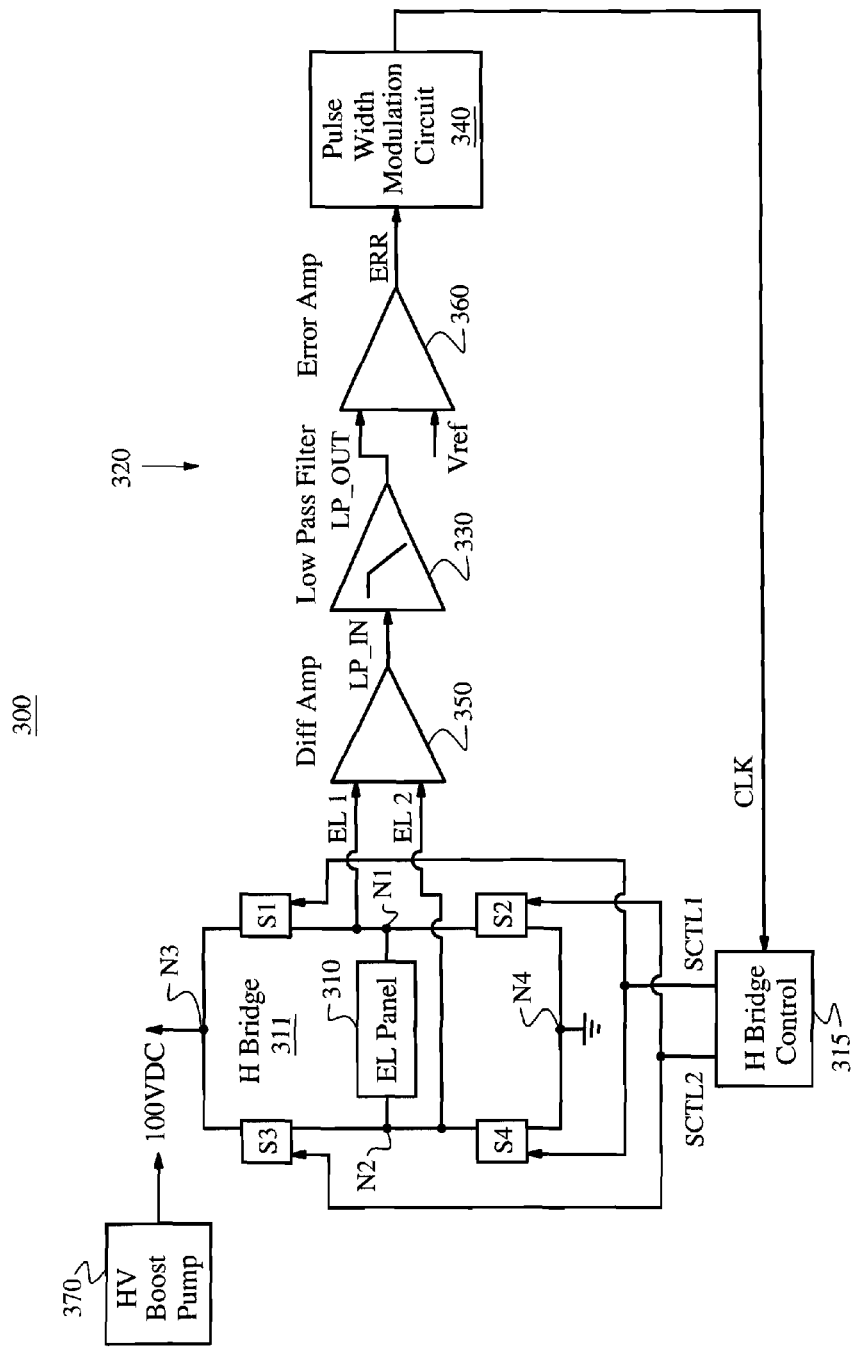
FIG. 3 shows a block diagram of an embodiment of the circuit of FIG. 2.

FIG. 3 shows a block diagram of an embodiment of circuit 300. Circuit 300 may be employed as an embodiment of circuit 200 of FIG. 2. Negative feedback circuitry 320 may further include differential amplifier 350, error amplifier 360, and pulse width modulation circuit 340. In the embodiment of circuit 300 shown in FIG. 3, the EL panel driver circuit includes an H-bridge (311). Also, in this embodiment of circuit 300, the EL panel driver control circuit includes H-bridge control block 315.

In this embodiment, the switches in the H-bridge may be arranged as follows. EL panel 310 is coupled between nodes N1 and N2. Switch S1 is coupled between power supply node N3 and node N1. Switch S2 is coupled between node N1 and node N4, where node N4 is ground in this embodiment. Switch S3 is coupled between node N3 and node N2. Switch S4 is coupled between node N2 and node N4.

In one embodiment, HV boost pump 370 is operable to provide a voltage, such as a 100V DC voltage, although the invention is not so limited, and other voltage levels may be employed. Although not shown, HV boost pump 370 may include a high-frequency oscillator and a boost pump that provides the 100V DC voltage based on the high-frequency oscillation signal.

In one embodiment, control of H-bridge 311 operates as follows. H bridge control block 315 controls the opening and closing of the switches (S1-S4) in H bridge 311. When signal SCTL1 is asserted, switches S1 and S3 are closed, and when signal SCTL1 is negated, switches S1 and S3 are open. Similarly, when signal SCTL2 is asserted, switches S2 and S4 are closed, and when signal SCTL2 is negated, switches S2 and S4 are open. Additionally, H bridge control block 315 is arranged to provide signal SCTL1 and SCTL2 such that signals SCTL1 and SCTL2 are not asserted simultaneously. In one embodiment, a break-before-make scheme may be employed. In one embodiment, when signal SCTL1 is asserted, signal EL1 is 100V, and signal EL2 is 0V. In this embodiment, when signal SCTL2 is asserted, signal EL1 is 0V, and signal EL2 is 100V. In one embodiment, the switching frequency (for switches S1-S4) is a constant frequency, but the duty cycle is adjustable.

In one embodiment, differential amplifier 350 is arranged to provide signal LP_IN from signals EL1 and EL2. Low-pass filter 330 is arranged to provide signal LP_OUT from signal LP_IN. In one embodiment, differential amplifier 350 and low-pass filter 330 operate to extract the DC component from the EL panel driver waveform, so that signal LP_OUT represents the EL panel DC offset.

Error amplifier 360 is arranged to provide error signal ERR based, at least in part, on the difference between signal LP_OUT and reference voltage Vref. In one embodiment, reference voltage Vref is zero volts. Pulse width modulation circuit 340 is arranged to perform pulse width modulation so that the duty cycle of signal CLK is based on error signal ERR. In one embodiment, pulse width modulation circuit 340 is arranged such that signal CLK has a constant frequency, but the duty signal is modulated based on error signal ERR.

H bridge control block 315 is operable to provide signals SCTL1 and SCTL2 based on signal CLK. In one embodiment, signal SCTL1 is substantially similar to signal CLK, and signal SCTL2 is the logical inverse of signal CLK. The change in the duty cycle of signals SCTL1 and SCTL2 cause the DC offset to change in H bridge 311 and EL panel 310. H bridge control block 315 may further include other components including level shifters and the like (not shown). Further, although not shown, H bridge control circuit 315 may include a low-frequency oscillator that provides a low-frequency oscillation signal (LF) from which signal CLK is generated by modulating the duty cycle.

If an EL panel is subjected to high temperature and/or high humidity, a DC offset may develop across the EL panel. This DC offset may cause damage to the EL panel and greatly diminish the life of the EL panel. One way to prevent a DC offset from developing is use large blocking capacitors, such as 1 µF to 10 µF blocking capacitors. For example, two blocking capacitors and one resistor may be used at each output. Negative feedback circuitry 340 allows for DC offset correction (for example, in high-temperature and/or high humidity conditions) without the need for blocking capacitors. Some cell phone applications may require multiple output EL drivers. The use of negative feedback circuitry 340 may eliminate the need for the many bulky blocking capacitors that are otherwise required in such an application.

Figure 4:
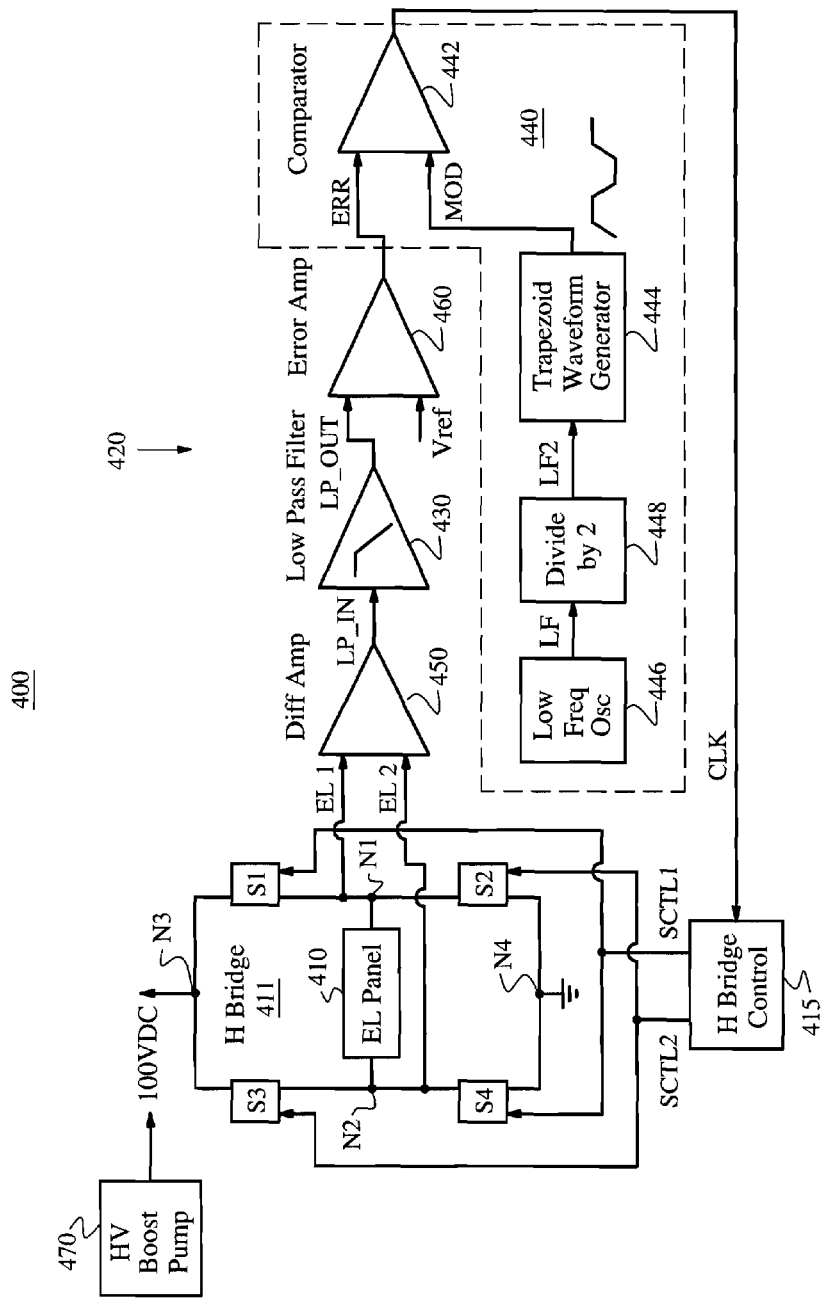
FIG. 4 illustrates a block diagram of an embodiment of the circuit of FIG. 3.

FIG. 4 illustrates a block diagram of an embodiment of circuit 400, which may be employed as an embodiment of circuit 300 of FIG. 3. Pulse width modulation circuit 440 may include comparator 442, trapezoid waveform generator 444, low frequency oscillator 446, and divide-by-two block 448. The low-frequency oscillator is employed by both the pulse width modulation circuit (440) and EL panel control circuit 412.

In operation, according to one embodiment low-frequency oscillator 446 provides low-frequency oscillation signal LF. Divide-by-two block 448 provides signal LF2 by dividing the frequency of signal LF by two. Further, trapezoid waveform generator 444 is arranged to provide modulation signal MOD from signal LF2. Comparator 442 is arranged to compare signal ERR with signal MOD, and to provide signal CLK based on the comparison. In one embodiment, a trapezoid waveform having a 50% duty cycle is employed as signal MOD, as described and shown; in other embodiments, a different modulating waveform such as a triangle or sawtooth waveform may be employed.

One embodiment of a pulse width modulation circuit is illustrated in FIG. 4. However, the invention is not so limited, and any type of pulse width modulation circuit may be employed.

Figure 5:
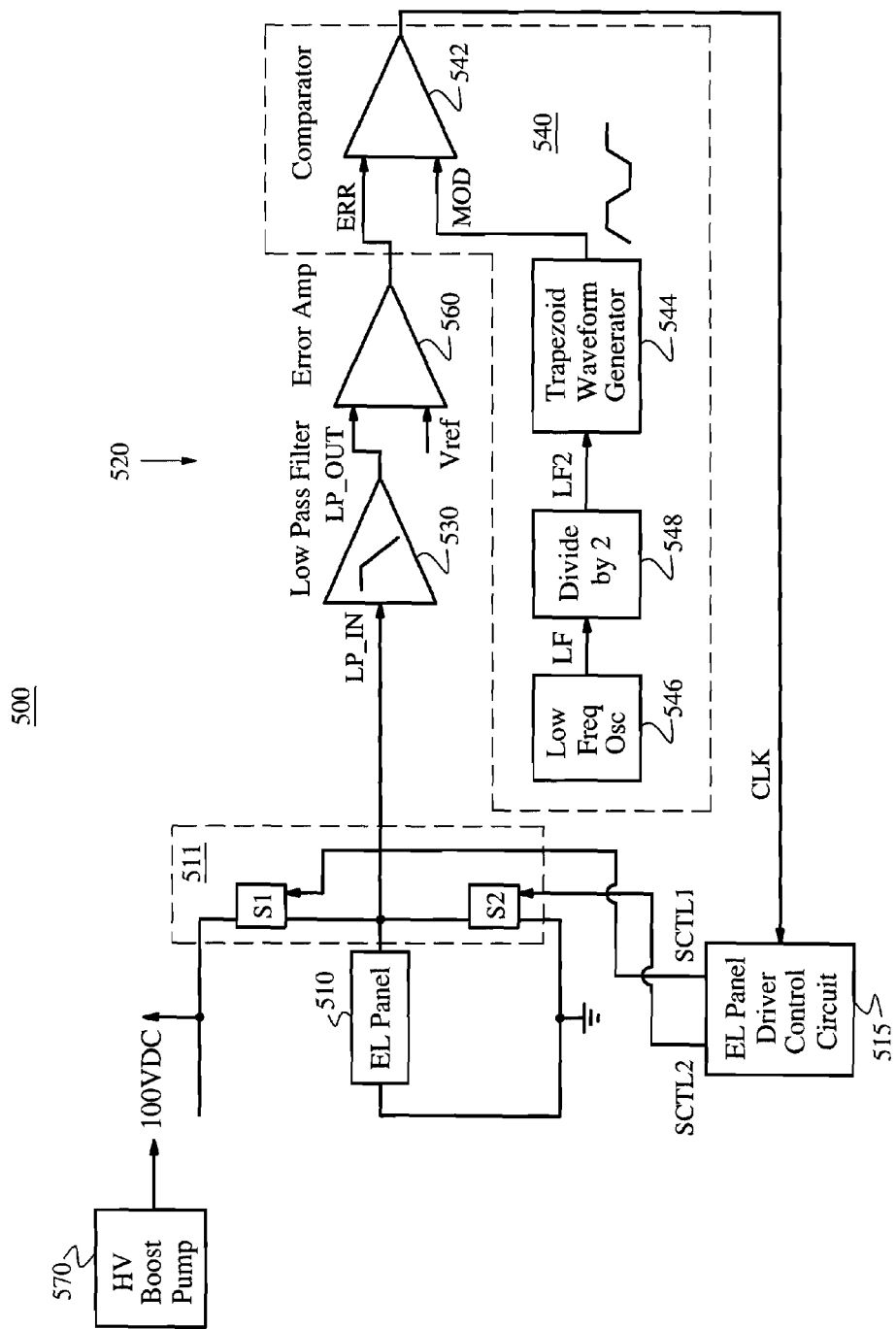
FIG. 5 shows a block diagram of another embodiment of the circuit of FIG. 2.

FIG. 5 shows a block diagram of an embodiment of circuit 500, which may be employed as an embodiment of circuit 100 of FIG. 1. Circuit 500 is substantially similar to circuit 400, albeit different in some ways. Instead of an H bridge, EL panel driver 511 provides a switching signal on only on side of EL panel 510, and the other side is grounded. Accordingly, EL panel driver 511 includes only two switches, S1 and S2. Accordingly, in one embodiment, a differential amplifier is not included in front of the low pass filter (530). Alternatively, however, in another embodiment a differential amplifier could be included, with the other input of the differential amplifier coupled to ground.

Figure 6:
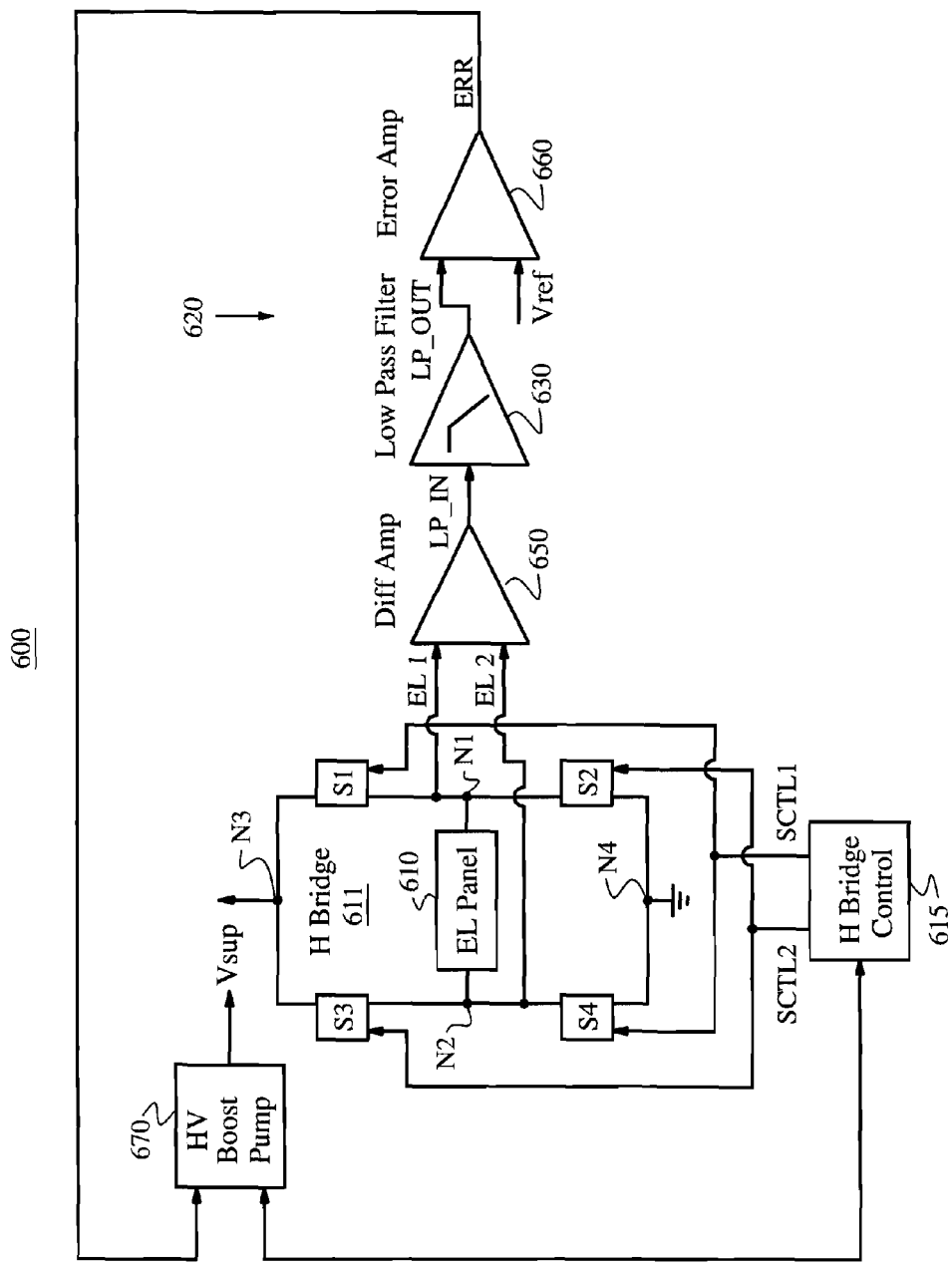
FIG. 6 illustrates a block diagram of yet another embodiment of the circuit of FIG. 2, arranged in accordance with aspects of the present invention.

FIG. 6 shows a block diagram of an embodiment of circuit 600. Circuit 600 may be employed as an embodiment of circuit 100 of FIG. 1. Negative feedback circuitry 620 may include differential amplifier 650, low-pass filter 630, and error amplifier 660. In the embodiment of circuit 600 shown in FIG. 6, the EL panel driver circuit includes an H-bridge (611). Also, in this embodiment of circuit 600, the EL panel driver control circuit includes H-bridge control block 615.

Circuit 600 is similar to circuit 300 of FIG. 3, albeit different in some ways. Rather than employing error signal ERR to modulate a duty cycle, in circuit 600, the error signal is employed to modulate the voltage Vsup provided by HV boost pump 670.

Boost pump 670 may be configured to modulate voltage Vsup on a half-cycle by half-cycle basis (half-cycles of the low-frequency oscillation signal). For example, in one embodiment, boost pump 670 is arranged to modulate voltage Vsup during each half cycle, so that on one half-cycle signal ERR voltage Vsup increases, and on the other half-cycle of the cycle voltage Vsup decreases. Which half-cycle has voltage Vsup decreasing depends on whether the DC offset error is positive or negative.

In another embodiment, boost pump 670 is arranged to modulate voltage Vsup during only one half-cycle of each cycle, so that Vsup always has a nominal voltage for one particular half-cycle, and on the other half-cycle voltage Vsup is modulated based on signal ERR.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A circuit for EL panel DC offset correction, comprising:
an electroluminescent (EL) panel driver circuit including a plurality of switches, wherein the EL panel driver circuit is operable to provide an EL panel driver output signal to an EL panel, wherein the EL panel driver is arranged such that the plurality of switches are controlled based, in part, on a clock signal; and
negative feedback circuitry that is arranged to adjust a DC bias associated with the EL panel for DC offset correction for the EL panel, wherein the negative feedback circuitry is arranged to adjust the DC bias by adjusting a duty cycle of the clock signal for DC offset correction for the EL panel.

2. A circuit for EL panel DC offset correction, comprising:
an electroluminescent (EL) panel driver circuit including a plurality of switches, wherein the EL panel driver circuit is operable to provide an EL panel driver output signal to an EL panel, wherein the EL panel driver is arranged such that the plurality of switches are controlled based, in part, on a clock signal;
negative feedback circuitry that is arranged to adjust a DC bias associated with the EL panel for DC offset correction for the EL panel; and
a boost pump that is arranged to provide a supply voltage to the EL panel, wherein the negative feedback circuitry is arranged to adjust the DC bias by adjusting the supply voltage.

3. The circuit of claim 2, wherein the negative feedback circuitry is further arranged to adjust the DC bias by adjusting a duty cycle of the clock signal for DC offset correction for the EL panel.

4. A circuit for EL panel DC offset correction, comprising:
an electroluminescent (EL) panel driver circuit including a plurality of switches, wherein the EL panel driver circuit is operable to provide an EL panel driver output signal to an EL panel, wherein the EL panel driver is arranged such that the plurality of switches are controlled based, in part, on a clock signal; and
negative feedback circuitry that is arranged to adjust a DC bias associated with the EL panel for DC offset correction for the EL panel; and
an EL panel driver control circuit that is arranged to control the plurality of switches based, in part, on the clock signal, wherein the negative feedback circuitry includes:
a low-pass filter having at least an input and an output, wherein the lowpass filter is arranged to low-pass filter a low-pass filter input signal to provide a lowpass filter output signal at the output of the low-pass filter, and wherein the low-pass filter output signal is based, at least in part, on the EL panel driver output signal; and
an error amplifier having at least a first input, a second input, and an output, wherein the first input of the error amplifier is coupled to the output of the lowpass filter, and wherein the error amplifier is arranged to provide an error signal at the output of the error amplifier.

5. The circuit of claim 4, wherein
the negative feedback circuitry further includes:
a pulse width modulation circuit that is coupled to the output of the error amplifier, wherein the pulse width modulation circuit is arranged to provide the clock signal such that a duty cycle of the clock signal is based, at least in part, on the error signal.

6. A method for EL panel DC offset correction, comprising:
driving an EL panel, based in part on a clock signal; and
employing negative feedback to adjust a DC bias associated with the EL panel for DC offset correction for the EL panel, wherein
employing negative feedback to adjust the DC bias associated with the EL panel includes employing negative feedback to adjust a duty cycle of the clock signal.

7. The method of claim 6, wherein employing negative feedback to adjust the DC bias associated with the EL panel includes employing negative feedback to adjust a supply voltage for the EL panel.

8. A method for EL panel DC offset correction, comprising: driving an EL panel, based in part on a clock signal; and employing negative feedback to adjust a DC bias associated with the EL panel for DC offset correction for the EL panel wherein employing the negative feedback includes: low-pass filtering a voltage across the EL panel; and providing an error signal based on the low-pass filtered voltage; and employing pulse width modulation to generate the clock signal such that the duty cycle of the clock signal is based on the error signal.

9. The method of claim 8, wherein
employing negative feedback to adjust the DC bias associated with the EL panel includes employing negative feedback to adjust a duty cycle of the clock signal.

* * * * *

UNITED STATES PATENT AND TRADEMARK OFFICE
CERTIFICATE OF CORRECTION

| | | |
|---|---|---|
| PATENT NO. | : 8,031,142 B1 | |
| APPLICATION NO. | : 11/532041 | |
| DATED | : October 4, 2011 | |
| INVENTOR(S) | : Mullin | |

It is certified that error appears in the above-identified patent and that said Letters Patent is hereby corrected as shown below:

In column 1, line 7, delete "an" and insert -- and --, therefor.

In column 4, line 35, delete "on" and insert -- one --, therefor.

In column 6, line 40, in Claim 8, delete "panel" and insert -- panel, --, therefor.

Signed and Sealed this
Twenty-ninth Day of November, 2011

David J. Kappos
*Director of the United States Patent and Trademark Office*